United States Patent
Zhou et al.

(10) Patent No.: US 11,336,846 B1
(45) Date of Patent: May 17, 2022

(54) CMOS IMAGE SENSOR WITH IMAGE BLACK LEVEL COMPENSATION AND METHOD

(71) Applicant: SmartSens Technology (HK) Co., Ltd, Kwun Tong Kowloon (HK)

(72) Inventors: Xuanping Zhou, Shanghai (CN); Yaowu Mo, San Jose, CA (US); Xiaoyong Wang, Shanghai (CN); Guanjing Ren, Shanghai (CN)

(73) Assignee: SmartSens Technology (HK) Co., Ltd., Kwon Tong Kowloon (HK)

( * ) Notice: Subject to any disclaimer, the term of this patent is extended or adjusted under 35 U.S.C. 154(b) by 0 days.

(21) Appl. No.: 17/140,404

(22) Filed: Jan. 4, 2021

(30) Foreign Application Priority Data

Oct. 30, 2020 (CN) .......................... 202011195824.0

(51) Int. Cl.
*H04N 5/355* (2011.01)
*H04N 5/374* (2011.01)
*H04N 5/369* (2011.01)

(52) U.S. Cl.
CPC .......... *H04N 5/355* (2013.01); *H04N 5/36963* (2018.08); *H04N 5/374* (2013.01)

(58) Field of Classification Search
CPC ..... H04N 5/355; H04N 5/36963; H04N 5/374

USPC .......................................................... 348/308
See application file for complete search history.

(56) References Cited

U.S. PATENT DOCUMENTS

| 7,564,489 | B1* | 7/2009 | Oten ...................... H04N 5/361 348/241 |
| 8,310,569 | B2 | 11/2012 | Willassen |
| 10,154,213 | B2 | 12/2018 | Yan |
| 10,397,510 | B2* | 8/2019 | Kim ....................... H04N 5/361 |
| 2008/0129847 | A1* | 6/2008 | Kobayashi ........... H04N 5/3728 348/E9.037 |
| 2009/0103829 | A1* | 4/2009 | Takahashi ................ H04N 9/09 382/260 |
| 2009/0322912 | A1* | 12/2009 | Blanquart .............. H04N 5/353 348/241 |
| 2012/0212657 | A1 | 8/2012 | Mo et al. |

\* cited by examiner

*Primary Examiner* — Lin Ye
*Assistant Examiner* — Chan T Nguyen
(74) *Attorney, Agent, or Firm* — Eric Karich; Karich & Associates

(57) ABSTRACT

An image sensor array and circuit design employs a method of black level compensation to address vertical image shading related to global exposure image capture and rolling row by row readout schemes. An image sensor having the invented black level compensation pixel array and method may be incorporated within a digital camera.

7 Claims, 4 Drawing Sheets

CMOS IMAGE SENSOR WITH IMAGE BLACK LEVEL COMPENSATION AND METHOD

BACKGROUND OF THE INVENTION

Field of the Invention

This invention relates generally to image sensors, and more particularly to CMOS image sensors. The present invention provides an image sensor array and circuit design employing black level compensation to reduce vertical image display shading. An image sensor comprising the invented black level compensation pixel array and method may be incorporated within a digital camera.

Description of Related Art

An image capture device includes an image sensor and an imaging lens. The imaging lens focuses light onto the image sensor to form an image, and the image sensor converts the light into electrical signals. The electric signals are output from the image capture device to other components of a host electronic system. The image capture device and the other components of a host electronic system form an imaging system. Image sensors have become ubiquitous and may be found in a variety of electronic systems, for example a mobile device, a digital camera, a medical device, or a computer.

A typical image sensor comprises a number of light sensitive picture elements ("pixels") arranged in a two-dimensional array in rows and columns. Such an image sensor may be configured to produce a color image by forming a color filter array (CFA) over the pixels. The technology used to manufacture image sensors. Complementary Metal-Oxide-Semiconductor ("CMOS") image sensors ("CIS"), may generate inaccurate image data due to dark current in the pixels themselves and variation in the level of dark current from pixel to pixel. Each pixel of a CIS array provides an output voltage that varies as a function of the light incident on the pixel. Unfortunately, dark currents add to the output voltages and degrade the picture provided by the imaging system. To generate accurate image data, it is desirable to estimate dark current and level correct for it resulting in black level compensation.

Most image sensors require some form of calibration before use so that the data obtained from the image sensor can be used to produce digital images that faithfully reproduce the optical characteristics (intensity, color, etc.) of the captured scene or object. Some calibrations can be carried out once and remain valid for every subsequent use of the image sensor, but other calibrations must be carried out for every single use of the image sensor. Black level calibration is one of the calibrations usually performed for every single use of an image sensor. As its name implies, the purpose of a black level calibration is to determine the black level of the image sensor. The black level calibration effectively sets a threshold below which digital data values obtained from the image sensor will be considered to represent the color black, or in other words, represent the absence or substantial absence of light. The threshold value is then used to adjust the values obtained from other pixels in the array. Accurate black-level calibration helps to achieve a digital picture with full contrast and subtle details in dark shadow regions. If the black level is too low, information in dark areas may be lost; if the black level is too high, signal range may be sacrificed. However, there are situations where the dark current is not uniform across the pixel array. For example, in frame exposure mode, wherein the shutter and integration of a pixel array is done simultaneously across the entire pixel array, the readout, is done one row at a time, so there is an integration time difference vertically across the array from the top to the bottom of the pixel array. Non-uniformity of the dark current in frame exposure, mode may cause vertical shading. Other causes of vertical shading include temperature gradients, process gradients, and pixel output settling. The present invention addresses the vertical shading issue providing an amended pixel array arrangement along with a method to adjust pixel image data to compensate for vertical shading. The present invention also provides further advantages as described in the following summary.

SUMMARY OF THE INVENTION

The present invention teaches certain benefits in construction and use which give rise to the objectives described below.

In a CMOS image sensor, a pixel array includes several pixel units, each of the pixel units adopting a three transistor 3T, 4T or 5T structure. The 4T, for example, includes a transfer transistor, a reset transistor, a source follower transistor, and a row select transistor. The pixel unit, uses photodiodes to perform photoelectric conversion to form photo-generated carriers and generate analog signals. By gating and reading the rows of the pixel array, the analog signals of each column are read out with subsequent operational gain amplification, analog-to-digital conversion (ADC), etc., comprising the signal processing process. The aforementioned vertical shading across the array from the uppermost rows to those at the bottom may be substantially related to the black or dark current associated with the pixel location. The invention provides an array design allowing for sampling and compensation of this dark current wherein covered rows of pixels are provided at, the top and bottom of the array along with a method to adjust the image signal.

A primary objective of the present invention is to provide an image sensor pixel array design and readout method which has advantages not taught by the prior art and provides for black level compensation to reduce vertical shading in a displayed image.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, an image sensor with black level compensation pixel array and method. Various embodiments of the image sensor with black level compensation pixel array and method are disclosed herein. In the following description, numerous specific details are set forth in order to provide a thorough understanding of the present invention. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Throughout the specification and claims, the following terms take the meanings explicitly associated herein, unless the context clearly dictates otherwise. The terms "coupled" and "connected," which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly coupled by way of a metal line, or indirectly connected by way of an intervening circuit element (e.g., a capacitor, resistor, or by way of the source/drain terminals of a transistor). The term "circuit" means either a single component or a multiplicity of components, either active or passive, that are coupled together to provide a desired function. The term "signal" means at least one current, voltage, or data signal.

Figure 1:
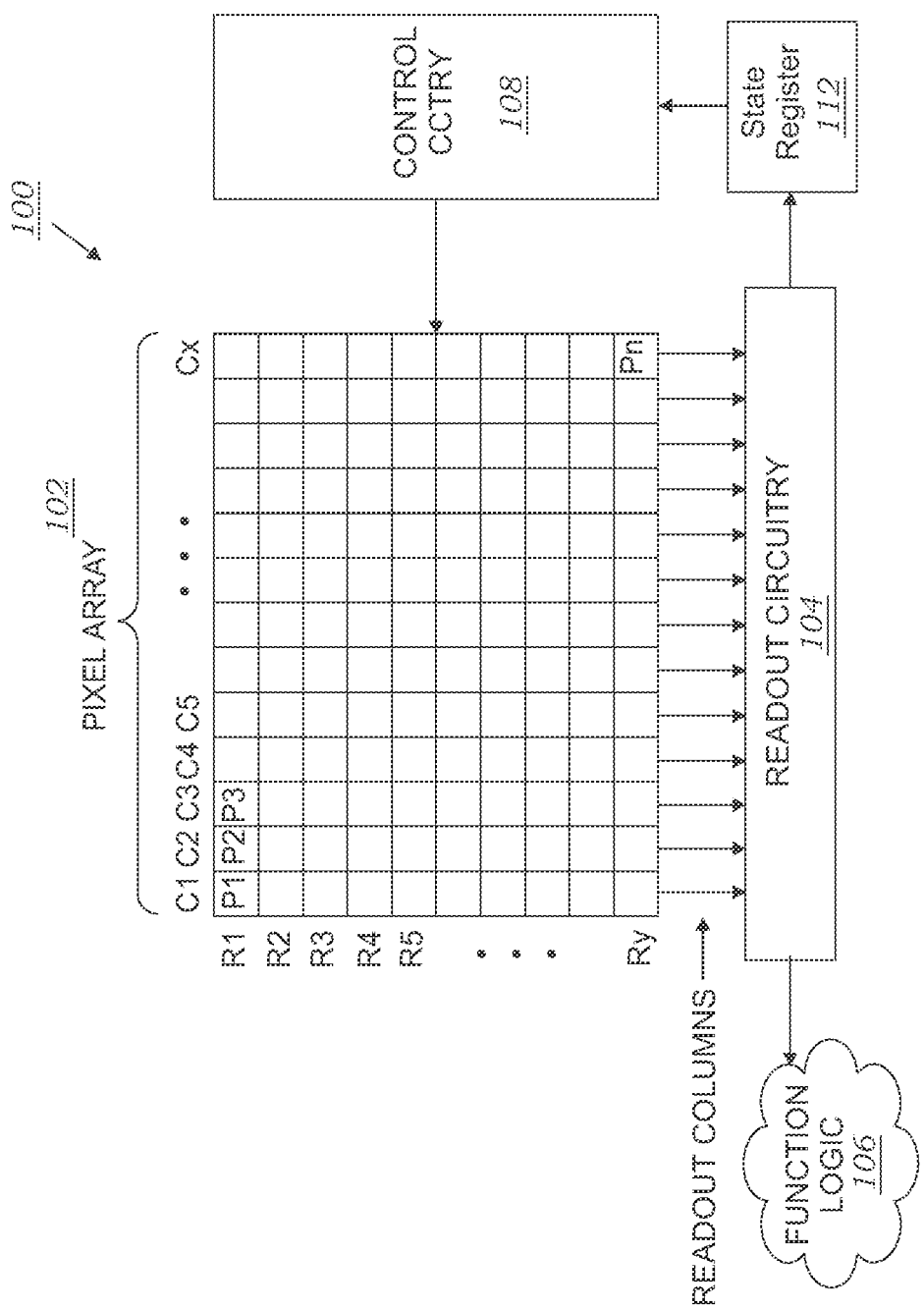
FIG. 1 is a diagram illustrating an imaging system including a pixel cell array having image sensor pixel cells included in an integrated circuit system, according to one embodiment of the present invention.

FIG. 1 is a diagram illustrating a first embodiment of an imaging system 100 including an example pixel array 102 having a plurality of image sensor pixels included in an example integrated circuit system with features in accordance with the teachings of the present invention. As shown in the depicted example, imaging system 100 includes pixel array 102 coupled to control circuitry 108 and readout circuitry 104, which is coupled to function logic 106. Control circuitry 108 and readout circuitry 104 are in addition coupled to state register 112. In one example, pixel array 102 is a two-dimensional (2D) array of image sensor pixels (e.g., pixels P1, P2 ..., Pn). As illustrated, each pixel is arranged into a row (e.g., rows R1 to Ry) and a column (e.g., column C1 to Cx) to acquire image data of a person, place, object, etc., which can then be used to render a 2D image of the person, place, object, etc. In one example, after each pixel has acquired its image data or image charge, the image data is readout by readout circuitry 104 using a readout mode specified by state register 112 and then transferred to function logic 106. In various examples, readout circuitry 104 may include amplification circuitry, analog-to-digital (ADC) conversion circuitry, or otherwise. State register 112 may include a digitally programmed selection system to determine whether readout mode is by rolling shutter or global shutter. Function logic 106 may simply store the image data or even manipulate the image data by applying post image effects (e.g., crop, rotate, remove red eye, adjust brightness, adjust contrast, or otherwise). In one example, readout circuitry 104 may readout a row of image data at a time along readout column lines (illustrated), or may readout the image data using a variety of other techniques (not illustrated), such as a serial readout or a full parallel readout of all pixels simultaneously. In one example, control circuitry 108 is coupled to pixel array 102 to control operational characteristics of pixel array 102. Some aspects of the operation of control circuitry 108 may be determined by settings present in state register 112. For example, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows. Readout of a captured image is typically done with rolling shutter methods and a result is that the last row readout lags the first row readout. During that lag time the last row of pixels may have acquired more dark current than was acquired by the first row. The result is shading and other image quality loss effects which the invention seeks to ameliorate.

Figure 2:
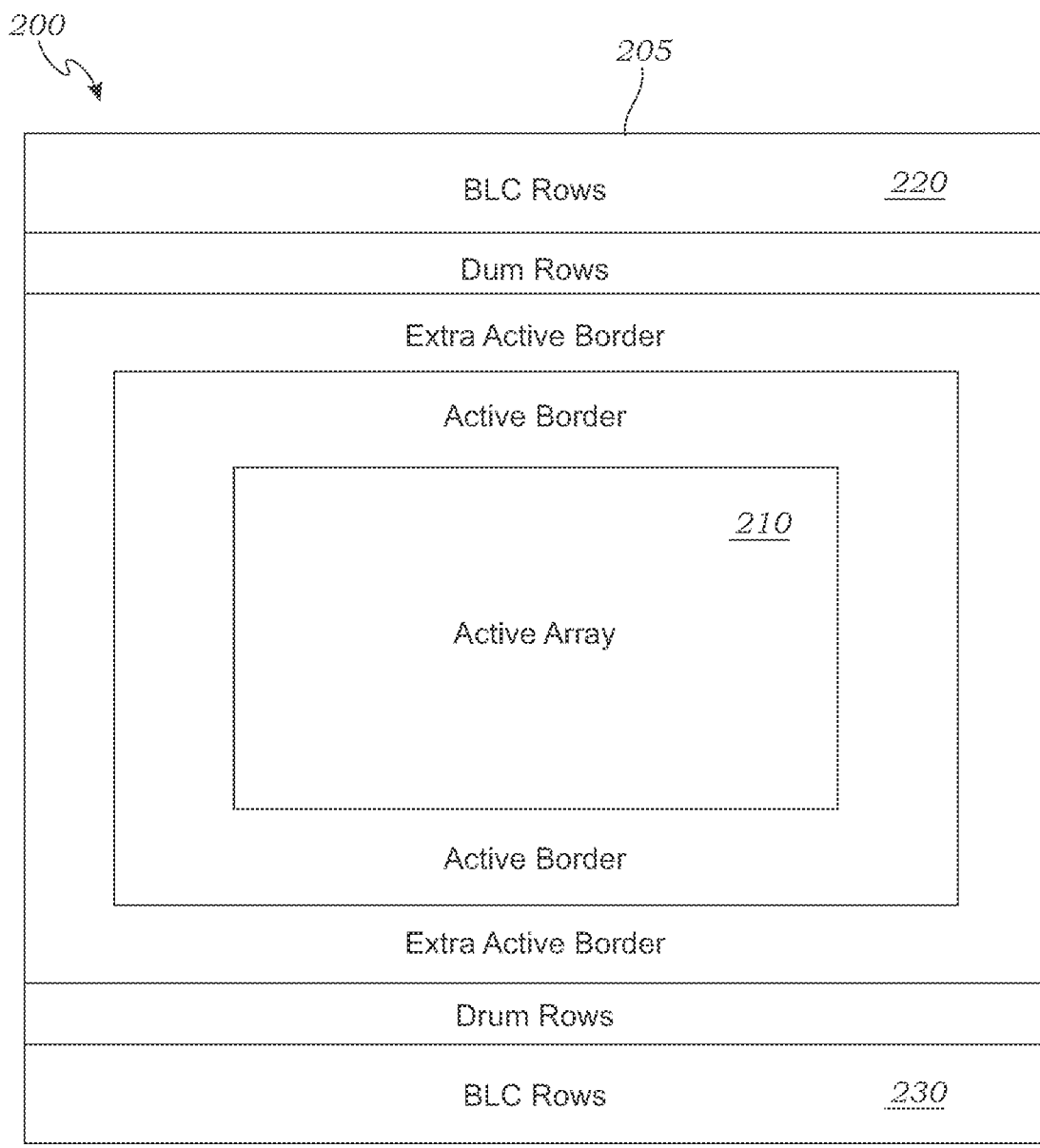
FIG. 2 illustrates an image sensor pixel array design representing one embodiment of the invention.

FIG. 2 illustrates an image sensor pixel array design 200 representing one embodiment of the invention. Image sensor array 205 comprises rows and columns of pixels wherein a central Active Array 210 of pixels are utilized to capture an image from incident light. Black Level Compensation (BLC) rows 220 and 230 are pixels fabricated identically to the pixels of array 210 except that they are covered to prevent any incident light from falling on them. A number of the topmost and bottommost rows of the array include opaque shields above their photodiodes prevent the generation of incident light related charge. These rows provide for the generation of black level compensation analog image signals. Rows 220 are positioned at the top and above the rows of Active Array 210 and rows 230 are positioned at the bottom and below the rows of Active Array 210. In one embodiment of the invention Rows 220 and 230 consist of two rows of pixels each. Vertical shading related to the difference in accumulated dark current from the uppermost rows of Active Array 210 and the lowermost rows of Active Array 210 may be compensated for by recording and modelling the dark levels of rows 220 and 230 and applying appropriate corrections to the image data recorded by the rows of Active Array 210. Additional rows and columns such as Dummy Rows (Dum) and Border Rows may be used in addition to the BLC rows in order to improve the resultant imaging quality but the BLC rows and the associated method of black level compensation represent the key inventive features.

The invented, image sensor with black level compensation and method relies on applying a real time correction to each frame of collected image data to account for the variation in dark current vertically down the rows of the imaging array. Following the capture of a frame of imaging data, that is capturing all the collected charges from all the pixels of the image sensor array, the invented image sensor and method is used to create a BLC and adjustment algorithm. In one embodiment the BLC algorithm can be as simple as a linear extrapolation between the imaging signal row averages of the top rows 220 of array 205, those covered to exclude incident light, and the imaging signal row averages of the bottom rows 230 of the array 205, which are also covered to exclude incident light. In this way the BLC adjustment values for the active array rows are inferred from the measured dark level charges accumulated by the covered rows.

Figure 3:
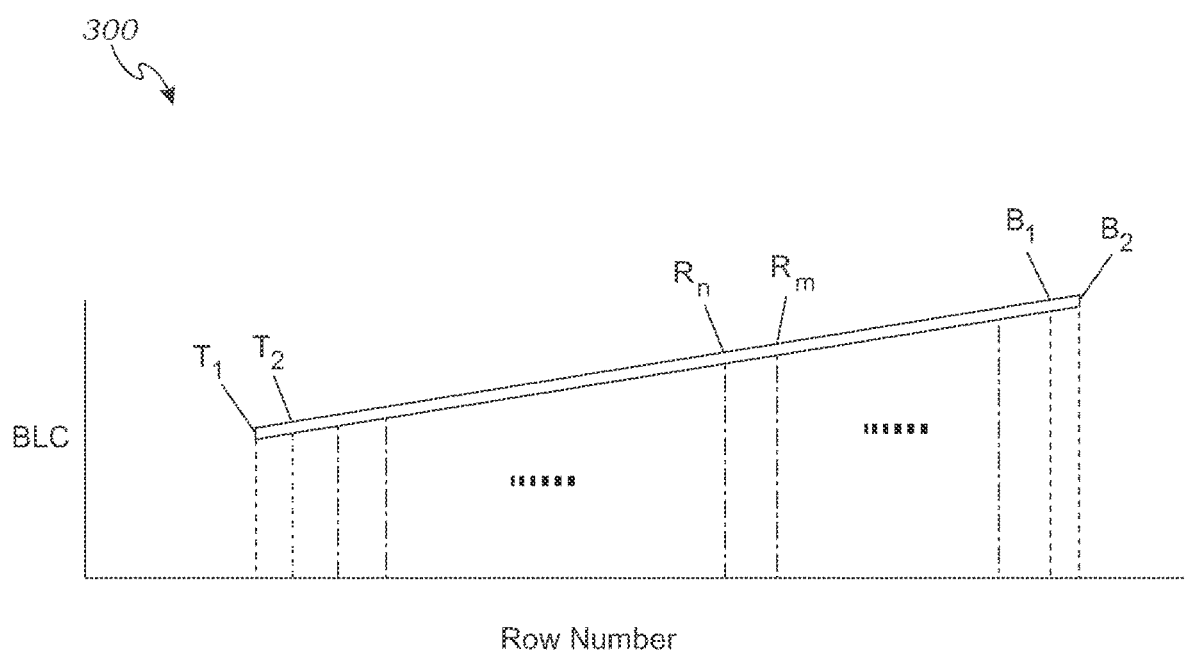
FIG. 3 illustrates a sample algorithm model for use in applying black level compensation.

FIG. 3 shows a plot 300 which illustrates such an algorithm obtained by linear extrapolation of the dark current signal portion $T_1$ and $T_2$ from top rows 220 of FIG. 2 to dark current signal portion Bi and B7 from bottom rows 230 of FIG. 2. The values of compensation to be applied to each of the interceding rows of active array 210 of FIG. 2, of which rows Rn and Iam are illustrative, are provided by the algorithm by simple extrapolation based on their row number or position between the top and bottom rows. The BLC algorithm may be more sophisticated curves or relationships should there be a design requirement or experimental observation to warrant it.

Figure 4:
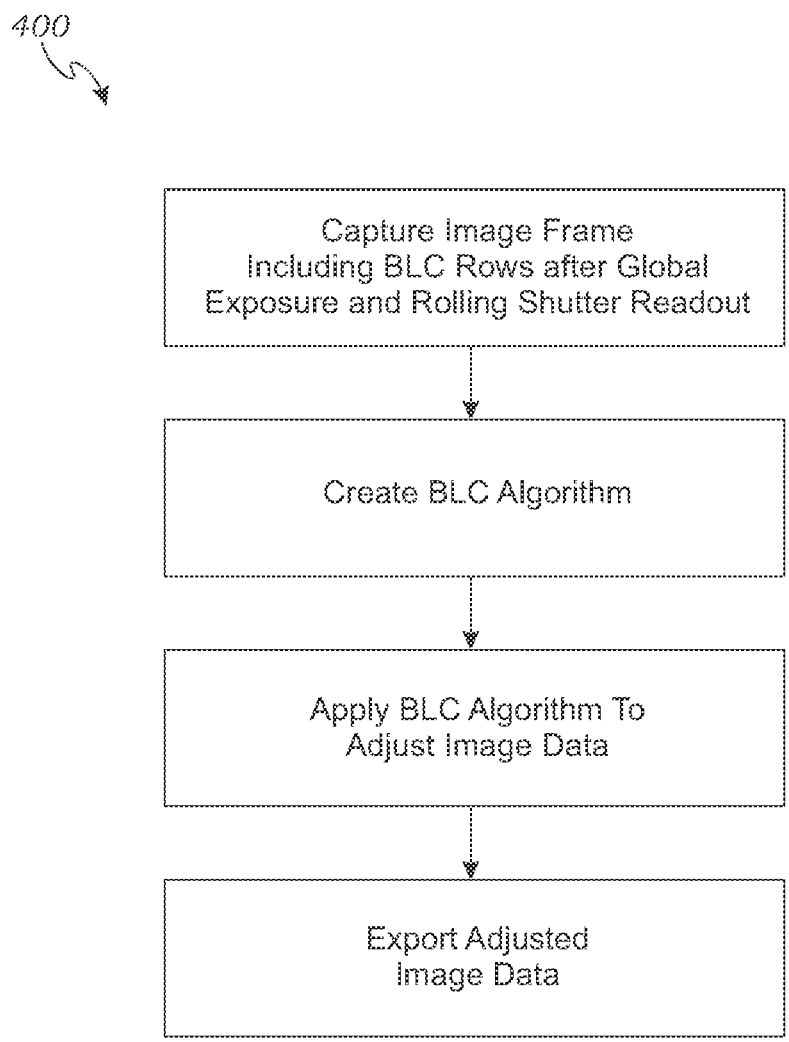
FIG. 4 illustrates a method according to the invention to provide black level correction to captured images.

FIG. 4 illustrates the invented Black Level Compensation method as block diagram 400. Step 1 involves use of the invented image sensor array with its covered topmost and bottommost rows of pixels to capture a frame of imaging signal incident upon the array after a global exposure and rolling shutter readout; then temporarily storing the frame of imaging data which consists of data from each row as it arrives in sequence. Step 2 consists of creating a BLC algorithm by extrapolating between the row averages of the top and bottom covered rows to determine BLC factors for all the intervening active imaging rows. Step 3 consists of applying the BLC algorithm generated adjustment factors to the appropriate rows of the stored frame of active image signals, and Step 4 consists of exporting the compensated imaging data frame. The BLC algorithm adjustments may be more practically applied after the image signal has processed through digital conversion in an ADC module, but any other method may be employed to implement the invented sensor and method. An on-image sensor digital signal processing (DSP) unit may be employed to perform the algorithm generation and signal adjustments, or an off chip or stacked chip DSP may be employed.

In one embodiment, the original image signal $D_{adc}$ output from the analog to digital converter circuit is obtained by the following formula:

$$D_{adc}=D_r+B_r+\Delta_r;$$

and the black level compensation values for each row of the topmost and bottommost rows is obtained by the following formula:

$$BLC=D_{adc(blc)}=0+B_r+\Delta_r=B_r+\Delta_r;$$

wherein Dr is the real image signal; Br is the background noise signal; Δr is the charge loss signal from sampling to readout, which is proportional to the time difference from sampling to readout.

In one embodiment, the real image signal is restored by separately performing linear compensation on each row through the black level compensation curve according to the following formula:

$$D_r=D_{adc}-BLC(y);$$

wherein, Dr is the real image signal, $D_{adc}$ is the original image signal output from the analog to digital converter circuit, and BLC(y) is the black level compensation value of pixel row(y).

In one embodiment, the black level compensation value of the pixel row(y) is obtained through interpolation by the following formula:

$$BLC(y)=BLCtop+\Delta K*y;$$

$$\Delta K=(BLCbtm-BLCtop)/VSIZE;$$

wherein ΔK is the slope of the black level compensation curve, and BLCtop is the black level compensation values of the topmost rows; BLCbtm is the black level compensation values of the bottommost rows, and VSIZE is the longitudinal size of the image acquisition array.

In other embodiments the BLC adjustments may be applied in the analog circuitry through feedback to the analog exposure control or analog gain control circuits. However, the signal transition between the covered BLC rows and the active rows may cause image jump or color correction anomalies after the initial image frame is captured. In this instance the methodology may be modified to initially capture the slope of the BLC algorithm curve and hold it for application to further frames. In another method the BLC measured values at the top and bottom of an initial frame are combined with the top row value of a following frame to estimate the bottom row value of the following frame. In one embodiment, the bottom row value $BLC_{btm}$ of the following frame is obtained by the following formula:

$$BLC_{btm}=\frac{BLC'_{btm}-BLC'_{top}}{BLC'_{top}}*BLC_{top};$$

wherein $BLC_{top}$ is the top row value of the following frame; $BLC_{top}'$ is the top row value of the initial frame; and $BLC_{btm}'$ is the bottom row value of the initial frame. These alternate methods address the possibility of image jump while exposure or gain adjustments are employed to compensate for black level variation.

In still another embodiment of the invention, in the case when the digital backend gain is large, the linear compensation algorithm may cause a line defect to be noticeable. In this case an embodiment of the invention will further add low-bit random numbers to the BLC algorithm curve.

In one embodiment, the adjusted real image signal Dr' is obtained by the following formula:

$$Dr'=D_{adc}-BLC(y)+\text{Random};$$

wherein $D_{adc}$ is the original image signal output from the analog to digital converter circuit; BLC(y) is the black level compensation value of pixel row(y); and Random is the low-bit random numbers. In this case the image data for each pixel of each row of the original image data is not completely consistent and the then the defects no longer fall in the same row thus blurring out the defect artifact. The quality of the resultant image is improved with this and the other Black Level Compensation measures and methods.

Reference throughout this specification to "one embodiment," "an embodiment," "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. Directional terminology such as "top," "down." "above," and "below" are used with reference to the orientation of the figure(s) being described. Also, the terms "have," "include," "contain," and similar terms are defined to mean "comprising" unless specifically stated otherwise. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The above description of illustrated examples of the present invention, including what is described in the Abstract, are not intended to be exhaustive or to be limited to the precise forms disclosed. While specific embodiments of, and examples for, the invention are described herein for illustrative purposes, various equivalent modifications are possible without departing from the broader spirit and scope of the present invention. Indeed, it is appreciated that the specific example structures and materials are provided for explanation purposes and that other structures and materials may also be employed in other embodiments and examples in accordance with the teachings of the present invention. These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. A method to compensate for black level variation vertically among the rows of an image sensor array comprising the following:
   providing an array of imaging pixels to generate analog image signals, wherein each pixel includes a photodiode that generates charge in response to incident light as well as dark current charge independent of incident light, and wherein the imaging pixels are arranged in a plurality of rows and columns;
   providing a number of the topmost and bottommost rows of the array wherein opaque shields above their photodiodes prevent the generation of incident light related charge and wherein these rows provide for the generation of black level compensation analog image signals;
   providing an analog to digital converter circuit coupled to an array image signal output circuit to digitize the analog image signals; and
   providing a black level compensation generating circuit for generating and applying an algorithm for compensating for black level variation vertically among the rows of the array through the following steps:
   first read and digitize and store a frame of the imaging signals from all the rows of the array including the topmost and bottommost rows;
   next generate a black level compensation algorithm or curve by using only the image signal data from the shielded topmost and bottommost rows and an interpolation between those datum to generate black level compensation values for each row between the topmost and bottommost rows;
   next combine the black level compensation values generated for each row of the imaging data to the stored frame of digitized image signals matching the row number of the stored data with the corresponding row number of the generated black level compensation value;
   wherein the average value of the image signal data of all pixels in a row from the shielded topmost and bottommost rows is used to generate the black level compensation values for each row between the topmost and bottommost rows;
   wherein the original image signal $D_{adc}$ output from the analog to digital converter circuit is obtained by the following formula:

$$D_{adc}=D_r+B_r+\Delta_r;$$

wherein the black level compensation values for each row of the topmost and bottommost rows is obtained by the following formula:

$$BLC=D_{adc(blc)}=B_r+\Delta_r=B_r+\Delta_r; \text{ and}$$

wherein Dr is the real image signal; Br is the background noise signal; and $\Delta r$ is the charge loss signal from sampling to readout, which is proportional to the time difference from sampling to readout.

2. The method to compensate for black level variation of claim 1, wherein:
   the black level compensation algorithm or curve is linear or a line;
   the real image signal is restored by separately performing linear compensation on each row through the black level compensation curve according to the following formula:

$$D_r=D_{adc}-BLC(y); \text{ and}$$

wherein Dr is the real image signal, $D_{adc}$ is the original image signal output from the analog to digital converter circuit, and BLC(y) is the black level compensation value of pixel row(y).

3. The method to compensate for black level variation of claim 2, wherein:
   the black level compensation value of the pixel row(y) is obtained through interpolation by the following formula:

$$BLC(y)=BLC\text{top}+\Delta K^*y;$$

$$\Delta K=(BLC\text{btm}-BLC\text{top})/V\text{SIZE}; \text{ and}$$

wherein $\Delta K$ is the slope of the black level compensation curve, and BLCtop is the black level compensation values of the topmost rows; BLCbtm is the black level compensation values of the bottommost rows, and VSIZE is the longitudinal size of the image acquisition array.

4. The method to compensate for black level variation of claim 1, wherein the black level compensation algorithm may be modified to initially capture the slope of the black level compensation algorithm curve from an initial frame and hold it for application to further frames.

5. The method to compensate for black level variation of claim 1, wherein:
   to the digitized black level compensation image signal values low-bit random numbers are added to the black level compensation algorithm curve such that visual defects no longer fall in the same row thus blurring out the visual impact of the defect artifact;
   wherein the adjusted real image signal Dr' is obtained by the following formula:

$$Dr'=D_{adc}-BLC(y)+\text{Random}; \text{ and}$$

wherein $D_{adc}$ is the original image signal output from the analog to digital converter circuit; BLC(y) is the black level compensation value of pixel row(y); and Random is the low-bit random numbers.

6. The method to compensate for black level variation of claim 1, wherein the black level compensation image signal values are transformed into feedback to the analog exposure control or analog gain control circuits wherein related adjustments provide the reduced vertical image display shading.

7. A method to compensate for black level variation vertically among the rows of an image sensor array comprising the following:
   providing an array of imaging pixels to generate analog image signals, wherein each pixel includes a photodiode that generates charge in response to incident light as well as dark current charge independent of incident light, and wherein the imaging pixels are arranged in a plurality of rows and columns;

providing a number of the topmost and bottommost rows of the array wherein opaque shields above their photodiodes prevent the generation of incident light related charge and wherein these rows provide for the generation of black level compensation analog image signals;

providing an analog to digital converter circuit coupled to an array image signal output circuit to digitize the analog image signals; and providing a black level compensation generating circuit for generating and applying an algorithm for compensating for black level variation vertically among the rows of the array through the following steps:

first read and digitize and store a frame of the imaging signals from all the rows of the array including the topmost and bottommost rows;

next generate a black level compensation algorithm or curve by using only the image signal data from the shielded topmost and bottommost rows and an interpolation between those datum to generate black level compensation values for each row between the topmost and bottommost rows;

next combine the black level compensation values generated for each row of the imaging data to the stored frame of digitized image signals matching the row number of the stored data with the corresponding row number of the generated black level compensation value;

wherein the black level compensation image signal values measured at the top and bottom of an initial frame are combined with the top row value of a following frame to estimate the bottom row value of the following frame;

wherein the bottom row value $BLC_{btm}$ of the following frame is obtained by the following formula:

$$BLC_{btm} = \frac{BLC'_{btm} - BLC'_{top}}{BLC'_{top}} * BLC_{top}; \text{ and}$$

wherein $BLC_{top}$ is the top row value of the following frame; is the top row value of the initial frame; and $BLC_{btm}'$ is the bottom row value of the initial frame.

* * * * *